Sept. 29, 1931.  A. SCHMIDT  1,825,606
CUTTING AND WELDING MACHINE
Filed May 17, 1929  6 Sheets-Sheet 1

INVENTOR
A. Schmidt,
BY
Langner, Parry, Card & Langner
ATT'YS.

Sept. 29, 1931.  A. SCHMIDT  1,825,606
CUTTING AND WELDING MACHINE
Filed May 17, 1929   6 Sheets-Sheet 2
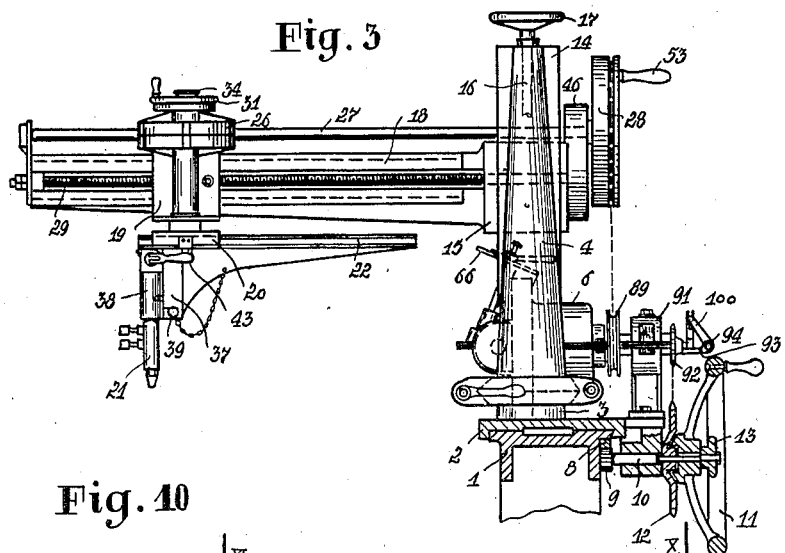
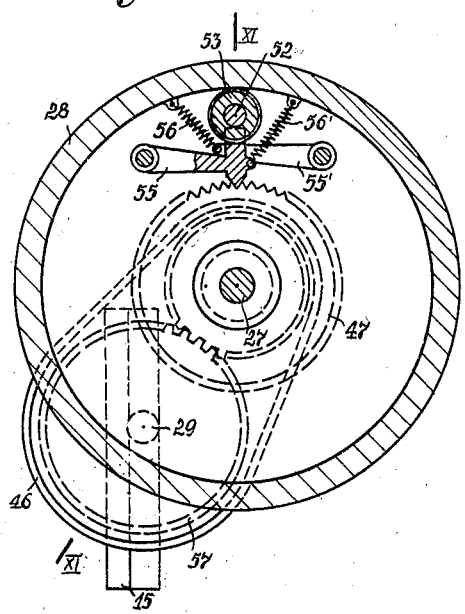
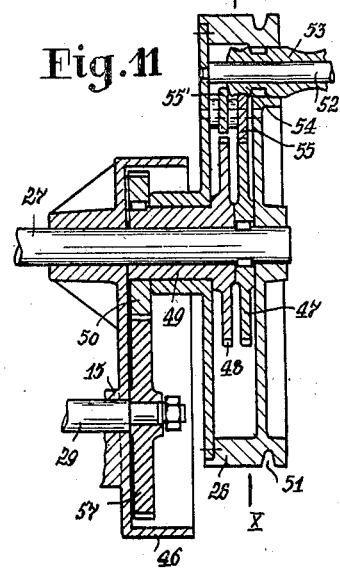
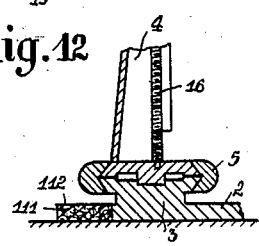
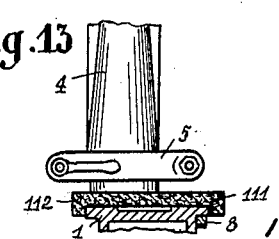
INVENTOR
A. Schmidt,
BY Langner, Parry, Card & Langner
ATT'YS.

Sept. 29, 1931.  A. SCHMIDT  1,825,606

CUTTING AND WELDING MACHINE

Filed May 17, 1929   6 Sheets-Sheet 3

INVENTOR
A. Schmidt,
BY Langner, Parry, Card & Langner
ATT'YS.

Sept. 29, 1931.   A. SCHMIDT   1,825,606
CUTTING AND WELDING MACHINE
Filed May 17, 1929   6 Sheets-Sheet 4

INVENTOR
A. Schmidt,
BY
ATT'YS.

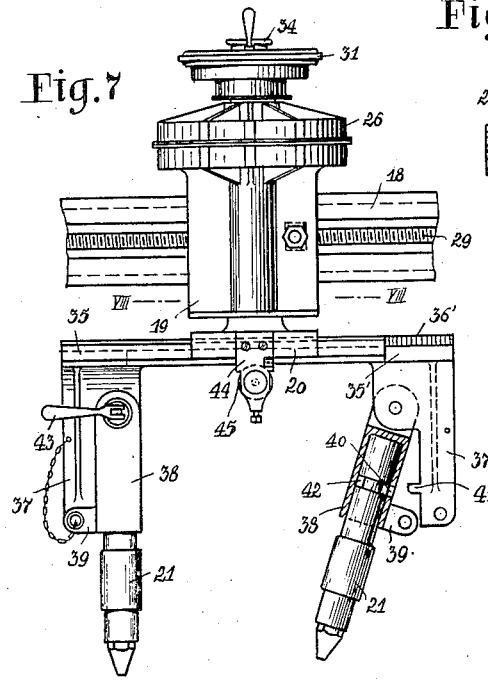

Sept. 29, 1931.  A. SCHMIDT  1,825,606
CUTTING AND WELDING MACHINE
Filed May 17, 1929  6 Sheets-Sheet 6

Patented Sept. 29, 1931

1,825,606

UNITED STATES PATENT OFFICE

ADAM SCHMIDT, OF STREBERSDORF, AUSTRIA, ASSIGNOR TO THE FIRM AKTIENGESELLSCHAFT FUR TIEFBOHRTECHNIK UND MASCHINENBAU VORMALS TRAUZL & CO., OF VIENNA, AUSTRIA

CUTTING AND WELDING MACHINE

Application filed May 17, 1929, Serial No. 363,965, and in Austria May 19, 1928.

The invention relates to a cutting and welding machine and has for its object, by means of a special manner of construction, both to enlarge the realm of application of such machines and to simplify the working of same. Exceedingly great cutting lengths can be obtained with the new machine and practically all patterns met with can be cut. A bearing guarding against shaking of the burner, as well as the independence of the movements of the gas supply pipes, ensures a clean cut. The arrangement is made in such manner that the operator is diverted as little as possible from taking care of the burner.

In the accompanying drawings, a suitable embodiment of the invention is illustrated by way of example.

Figure 1:
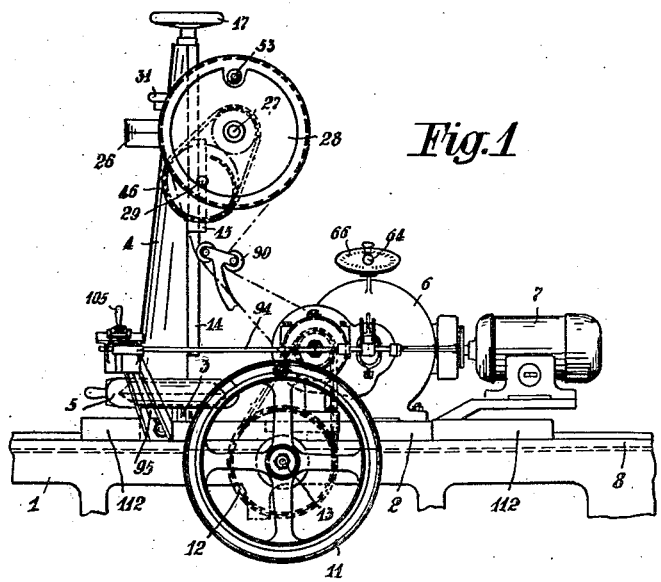
Figure 2:
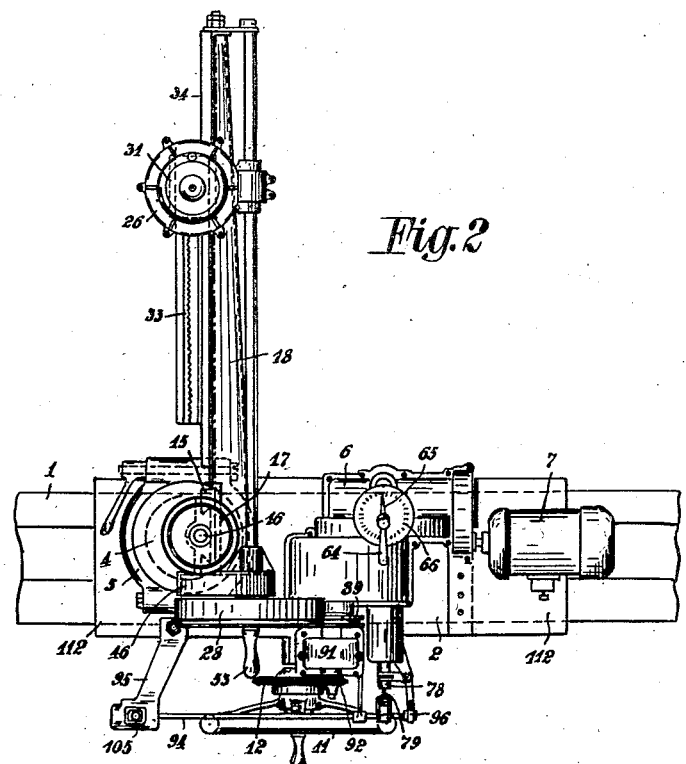
Figure 4:
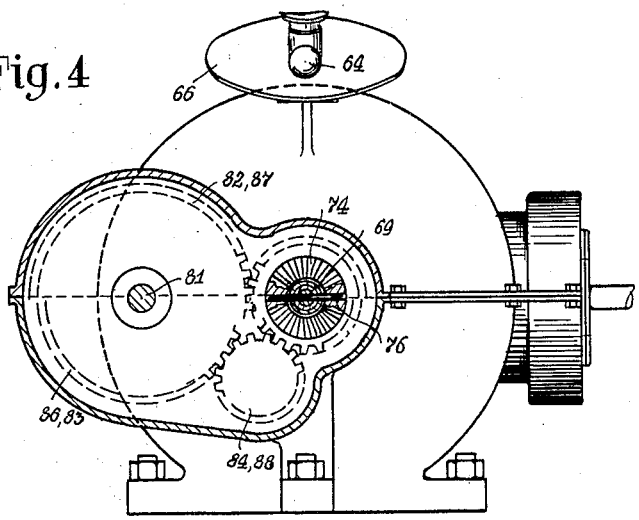
Figure 5:
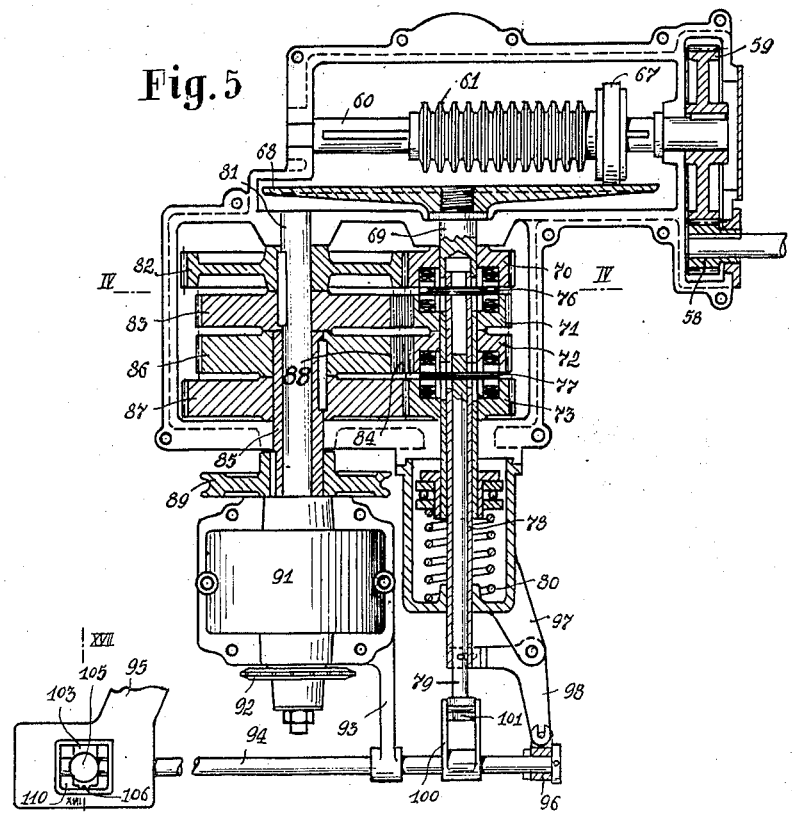
Figure 6:
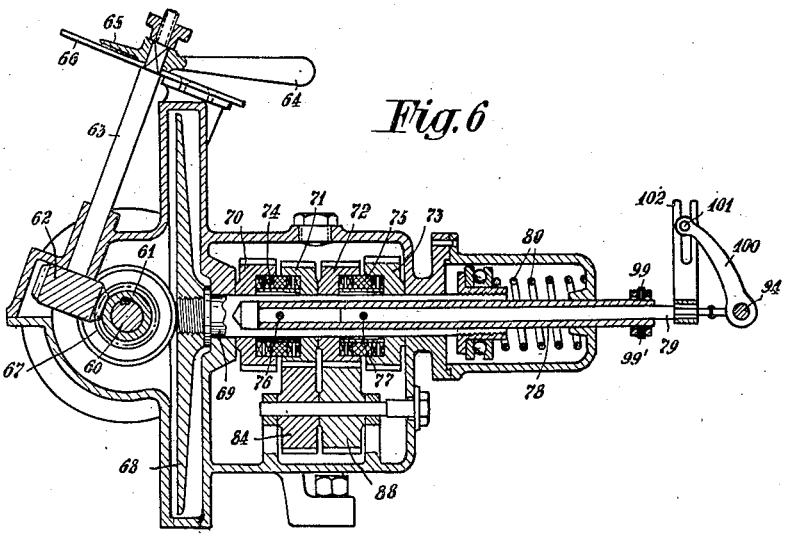
Figure 17:
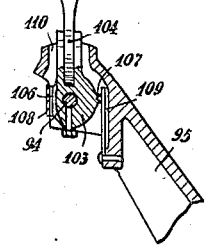
Figure 18:
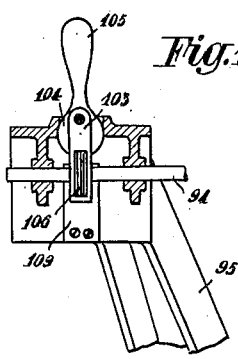
Figure 19:
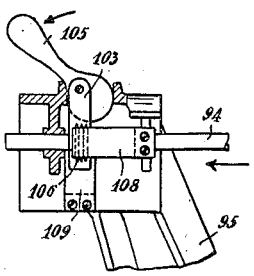

Fig. 1 is a front elevational view, Fig. 2 a top plan view, and Fig. 3 a side elevational view of the machine, parts being shown in section, Figs. 4, 5 and 6 show the gearing of the machine in vertical section on line IV—IV of Fig. 5, in top view with the cover of the casing removed, and in longitudinal section, respectively, Figs. 7, 8 and 9 show the bearing and the construction of the burner, Fig. 8 being a section on line VIII—VIII of Fig. 7 while, Figs. 10 to 21 show details of the machine in accordance with the invention, Fig. 10 being a section on line X—X of Fig. 11, Fig. 11 being a section on line XI—XI of Fig. 10, and Fig. 17 being a section on line XVII—XVII of Fig. 5.

On a bed 1, a longitudinal support 2 is movable and this support carries a round base piece 3 (Figs. 1 and 12) on which a post 4 is rotatable, and which is fixable by means of a clamping ring 5. The support 2 also carries the gearing 6 and the motor 7, which elements are displaced laterally from the base piece 3. The bed 1 is shown as provided with a rack 8 in which engages a pinion 9. The latter is shown as mounted on a shaft 10 (Fig. 3) which has its bearing in the support and carries at its end a hand-wheel 11, adapted for moving the support longitudinally. Between the bearing of the shaft 10 and the hand-wheel 11 there is a loose rotatable chain-wheel 12 which, on tightening nut 13, is coupled with the hand-wheel, and thereby with the shaft 10.

The post 4 is provided with a prismatic guide 14 for a height support 15, which is to be raised and lowered by means of a screw spindle 16 with hand-wheel 17, and which carries a rigid outrigger-arm 18 with a transverse support 19 slidable thereon (Figs. 3, 7 to 9). This serves as a bearing for a rotatable support 20, in which a bracket 22 carrying the burner 21 is slidably arranged (Fig. 3). The rotatable support 20 is secured to the lower end of an axle 23, which latter carries a worm-wheel 24 meshing with a worm 25 which, together with the worm wheel, is enclosed in a casing 26 of the transverse support 19.

The worm is slidable on a shaft 27 (Figs. 7 to 9), penetrating through the casing and having its bearings in the height support 15, and which shaft 27 can be driven by a driving wheel 28. The movement of the transverse support 19 is effected in the usual manner by means of a leading screw 29 which can be also driven through the intermediary of the driving wheel 28, as shall be described hereafter.

The axle 23 is preferably hollow in order to receive a spindle 30 which carries at its upper end a hand-wheel 31 and at its lower end a pinion 32 which engages in a rack 33 (Figs. 14, 15) of the bracket 22 and effects a longitudinal displacement of the same when the hand wheel 31 is actuated. Preferably a planet-gear is inserted in the hand-wheel, which may be put into action by loosening a nut 34. In this manner, the burner bracket 22 can be moved with different speeds.

The details of the bearing of the burner in its bracket may be seen from Figs. 7 and 8 in which, at the same time, an arrangement with two burners (double-burner) is shown. Whilst the burner bracket for a single burner is shown in Figs. 3, 14 and 15; for a double-burner two brackets (35, 35') are provided, arranged side by side and which are slidably arranged in the support 20. These brackets, each carry a burner 21 arranged symmetrically with respect to the pivot of the support, are driven in opposite directions by the pinion 32 meshing with the racks 36, 36'. The bearing of each burner on its bracket is effected by means of a socket 38 pivoted to an arm 37 of the bracket, the socket being provided with two parallel lugs 39 which clasp the inner end of the arm 37 in the manner of a fork, and which can be secured by a pin. The socket 38 has an opening 40 adapted to receive a pin 41 on the arm 37, which pin enters a groove 42 of the burner when the burner is in place in the socket. The socket 38 is adapted to be secured in position by a clamping lever 43. At the sides of the support 20 are bearings provided for rollers 45, 45' which support the burner brackets from below.

In order to be able to adjust the burner in any inclined position towards the work-surface, an intermediate piece is inserted in the rotatable support 20 in place of the bracket 22 (Fig. 3), which piece is provided with a pivotable and fixable guide (Fig. 16) for the burner bracket 22.

A casing 46 is cast integral with the height support 15 and serves in its upper portion as a bearing for the shaft 27, on which are arranged a fixed ratchet wheel 47 and a loose ratchet wheel 48, the hub of the latter extending as far as the bottom of the casing 46, and carrying at that point a toothed wheel 50. The driving wheel 28 is formed as a fly wheel, has a groove 51 for a driving strap, and is loose on the hub 49. The fly wheel is provided with a bolt 52 on which a handle 53 for manual driving is slidable. The bolt carries a collar 54 which, in being moved, pushes clutches 55, 55', attached to the fly wheel and actuated by springs 56, 56', alternately against the ratchet wheels 47, 48, so that either the shaft 27 or, by the intermediation of the toothed wheel 50 and a toothed wheel 57 engaging in the same, the leading screw 29 can be driven. In case of mechanical driving, the handle 53 serves only for actuating the coupling.

The mechanical driving is effected by the motor 7 by means of an intermediate gear 58, 59 (Fig. 5) operating a shaft 60 on which a round rack is slidable and secured against rotation. (Figs. 5 and 6). The rack 61 meshes with a toothed wheel 62 which is secured to a spindle 63, which latter is supported in the cover of the gear and carries at its end a handle 64 provided with a hand 65 coacting with a graduated disk 66. The rack 61 is rigidly connected with a friction wheel 67 coacting with a plate-shaped disk 68 which is rigidly mounted on a hollow spindle 69 supported in the casing of the gearing. On this hollow spindle, toothed wheels 70, 71, 72, and 73 are rotatably mounted, and are secured against displacement by spacing rings. On these rings toothed coupling members are movable and which are rigidly connected with bolts 76, 77. The bolt 76 projects through a slit of the hollow spindle 69 and is secured to a hollow rod 78 slidable in the spindle 69. The bolt 77 projects through slits of rods 78 and 69 and is rigidly connected with a rod 79 which is slidable in the hollow rod 78. The coupling members 74, 75 can be brought alternately into engagement with coupling teeth of the toothed wheels 70, 71, 72, 73 respectively, by shifting the rods 78, 79 correspondingly. The pressing of the disk 68 against the friction wheel 67 is effected by a spring 80. On a shaft 81 supported in the casing of the gearing two toothed wheels 82, 83 are rigidly mounted, the first of which meshes with the toothed wheel 70 and the second with the toothed wheel 71 through the intermediary of an intermediate wheel 84. Beside the toothed wheels 82, 83, two toothed wheels 86, 87 are fixedly mounted on a tube 85 rotatable on the shaft 81, of which wheels the first one engages with the toothed wheel 72 by means of the intermediate wheel 88 and the second one directly with the toothed wheel 73. The tube 85 carries on that end which projects through the casing a fixed pulley 89 which effects the driving of the fly wheel 28.

With regard to the displacement of the support 15 as to its height, a tension device 90 is provided. The shaft 81 drives through the intermediary of a planet-gear 91, a chain wheel 92, the chain of which runs over the chain wheel 12 of the shaft 10.

The casing of the planet-gear 91 is provided with an arm 93 which carries a bearing for a governing rod 94 which is additionally supported in an arm 95 of the support 2. At the end of the governing rod 94 a loose collar 96 is arranged, which is acted upon by an angle-lever 98 supported in a projection 97 of the casing. The other arm of this lever 98 clasps by means of its forked ends, two pins 99, 99' of the hollow rod 78 (Fig. 6). To the governing rod 94, an arm 100 is secured, which latter engages with a cross-bolt 101 in a fork 102 rotatably mounted on the rod 79. The free end of the governing rod 94 carries a forked piece 103 (Figs. 17, 18) in which an eccentric disk 104 with a handle 105 is supported. The eccentric disk is rotatable between the parallel guiding faces of the forked piece 103. The forked piece 103 has stops 106, 107 in order to ensure its normal position. The stop 106 extends perpendicularly, the opposite stop parallel to the axis of the governing rod. The stops coact with spring blades 108, 109. The turning of the handle 105 is limited by a slot 110 of the supporting arm 95. A turning of the handle in the direction of the governing rod effects a shifting of the same in the same direction and thereby engaging of the member 74 in the coupling teeth of the wheels 70 or 71 accordingly as the handle is turned to the left or to the right. By this means also the longitudinal support 2 correspondingly driven through the intermediary of the toothed wheels 82 or 83, 84 of the shaft 81, the planet-gear 91, the chain wheels 92 and 12, the pinion 9 and the rack 8. A turning of the handle 105 transversely to the governing rod 94 effects a rotation of same and thereby, by means of the arm 100, a shifting of the rod 79 in a direction corresponding to the turning. By this means the coupling piece 75 (Fig. 6) engages in the coupling teeth of the toothed wheel 72 or 73, whereby the transverse support 19 is shifted in the corresponding direction through the intermediary of the toothed wheels 88 and 86, or 87, the pulley 89, the fly wheel 28 and the leading screw 29. If the handle is turned into the corners of the slot 110, both coupling members are engaged simultaneously, whereby both the longitudinal and the transverse support are actuated and the burner is shifted in a corresponding oblique direction. The arrangement is conveniently made in such manner that the motion of the longitudinal and the transverse support is of the same magnitude so that the oblique cuts are executed at an angle of 45°.

In order to prevent the entering of iron oxide occurring during the working under the longitudinal support, felt packings 111 (Figs. 12 and 13) are provided at the front sides of the support, which packings are held by a covering-plate 112 (Figs. 1, 2, 12, and 13) secured to the support.

The machine which, as can be seen, can be driven mechanically as well as manually, is operated in the following manner:

In mechanical driving, the motor 7 drives the hollow spindle 69 by means of the intermediate gear and the friction gear (Fig. 5). If the longitudinal support 2 is to be guided parallel to the bed 1 for a longitudinal cut, the nut 13 (Fig. 3) must be tightened after the height support has been adjusted in the right way by means of the hand-wheel 17; whereby the chain wheel 12 is coupled with the hand-wheel 11 and also with the shaft 10. In order to now shift the longitudinal support, the handle 105 (Fig. 5) is turned in the desired direction and the governing rod 94 is moved accordingly, whereby, as explained above, the chain wheels 92 and 12 are driven and the tooth gear 9, and rack 8 of the support are actuated. If the transverse support is to be operated for a cut transverse to the bed 1, the handle 105 is turned in the corresponding direction and therewith the governing rod is rotated, whereby, through the gearing, the pulley 89 and the fly wheel 28 are driven correspondingly. For the purpose in question (rectilinear motion of the burner perpendicular to the bed 1) the handle 53 (Fig. 11) must be pushed in completely, whereby when the clutch 55' is pushed against the ratchet wheel 48, this wheel is carried along by the fly wheel, and the leading screw 29 is driven through the toothed wheels 50 and 57.

For cuts with an angle of 45° with regard to the bed 1, the longitudinal and the transverse support are actuated by turning the handle 105 into the corresponding corner of the slot 110. As a result the governing rod is both shifted and rotated, whereby, through the gearing, the chain wheel 92 and pulley 89 are driven simultaneously.

In order to execute circular cuts, the handle 105 is turned in a direction transverse to the governing rod 94 so that the pulley 89 alone is driven. The handle 53 of the fly wheel 28 must be completely pulled out, whereby the clutch 55 is pushed against the ratchet wheel 47. This wheel is carried along by the fly wheel, the shaft 27 is driven and the support 20 is rotated through worm gear 25, 24. The radius of the circle cut depends on the distance of the burner axis from the pivot of the support 20. This distance can be varied by means of the hand-wheel 31. On account of this adjustment being possible also during the rotating of the support, also ellipses and spirals and other figures can be cut.

Rectilinear cuts under any desired angle with regard to the bed 1 can be executed by turning the post 4 by means of the clamping ring 5 and actuating the transverse support. By simultaneously turning the hand-wheel 31, deviations from the direction of this rectilinear motion, as for instance steps or the like, can be cut. By actuating the fly wheel further combined motions can be attained.

The cutting speed can be adjusted in the usual manner by moving the handle 65 to the desired setting on the disc 66 (Fig. 6) by means of the handle 64.

For the cutting of patterns with a symmetry-axis, for instance connecting rods, the double-burner is used, which works simultaneously, the points lying opposite each other with regard to the axis of symmetry. According to the main direction of the piece to be cut, either the longitudinal or the transverse support is actuated. For changing the distance of the cutting lines from the symmetry-axis the hand-wheel 31 is operated correspondingly.

With complicated forms of cutting, manual operation of the longitudinal and transverse support in place of mechanical operation can be instantaneously accomplished by resetting the handle 105 in its normal position and manually turning the hand-wheel 11, and the fly wheel 28. In the same manner a combination of mechanical and manual driving can be effected. For cutting bevelled edges, the intermediate piece (Fig. 16) is inserted into the rotatable support 20, this intermediate piece receiving the burner bracket.

The machine can also be employed for cutting with patterns. For the operation of the machine when employed with patterns, the pattern or template is supported in a horizontal plan about the support carrying the burner in such manner as to leave its bevelled edge free for the passage of the guide pinion or roller around it, which roller is then arranged on the top of the said support and is driven by the intermediary of the shaft 27. For use as a welding machine, suitable burners are inserted in the socket 38 and guided over the welding-line by means of any suitable auxiliary device.

One of the chief advantages of the machine lies in its ability to cut nearly every figure without the use of a pattern and to change from mechanical to manual driving. The desired uniformity of motion of the burner in manual driving can be attained by suitably choosing the ratio of transmission and the mass or inertia of the fly-wheel.

Figs. 20 and 21 illustrate an example of a device by means of which the number of directions in which the burner can be automatically guided with motor driving can be increased, the essence of this construction comprising providing in the gearing of the transverse and round support, a planet-gear which can be engaged for influencing alternately the speed of rotation of the shafts of these supports and which can be locked for complete disengagement.

Fig. 20 is a sectional view of the fly wheel and the adjacent parts along the line I—I of Fig. 21 and Fig. 21 is a plan view of Fig. 20 seen from the left side, with the fly wheel removed.

The casing 46 of the height support, the fly wheel 28 with handle 53, the toothed wheel 57 and the arrangement of the shafts 27 and 29 correspond in their construction to Figs. 10 and 11. In place of the ratchet wheels 47, 48 shown in these figures with hubs 49 and toothed wheel 50 and the clutches 55, 55', in Figs. 20, 21 the following arrangement is provided:

On the shaft 27 a toothed wheel 113 is rigidly mounted and a tube 114 provided which carries at its end toothed wheels 115, 116 of which the latter engages with the driving wheel 57 of the shaft 29. On the tube 114 pairs of wheels 119, 120 and 121, 122 respectively connected by tubes 117, 118, are rotatably mounted. The fly wheel 28, loosely mounted on the tube 118, has a bolt 123 between the handle 53 and the axis of rotation, on which bolt planet wheels 124, 125 are feeely rotatable, and which mesh with the toothed wheels 122, 120 of the pairs of wheels mentioned above. On the hub 126 of the wheel 125 a pinion 127 is shiftable, and is secured against rotation, which pinion can be controlled by a fork 128 of the handle 53. A pin 129 of the handle 53 corresponding to the pin 52 in Fig. 11 has two resting grooves 130, 131 in to which a spring-actuated ball 132 or the like of the handle can fall. The pinion 127 can be engaged either with the wheel 113 of the shaft 27 or with the driving wheel 115 for the shaft 29, as a result of axial displacement of the handle 53.

The casing 46 has a top piece 133 supporting a pin 134 of a lever 135 which ends in a socket 136 in which the bolt 137 of a fork 138 is slidable. The fork bolt is actuated by a spring 139 which pushes it continuously against the shaft 27 and is provided with a handle 140. The top piece 133 has an arcuate guide with three stops 142, 143, 144 into which a pin 148 of the bolt 137 can fall. In the fork branches a toothed wheel 145 is supported which can be brought into engagement with the wheels 119, 121 of the pairs of wheels. The fork branches carry at their end ratchet teeth 146, 147 which can block alternately the wheels 119 and 121 respectively according to the angular position of the fork.

In the middle position of the fork (stop 142) the planet-gear is blocked and therewith the action of the machine is the same as before, because both toothed wheels 119, 121 are blocked.

By turning the fork and fixing it in the stops 143 or 144 respectively, either the wheel 119 or the wheel 121 is blocked, and therewith the number of revolutions of the shafts 27 or 29, respectively, is changed according to the position of the pinion 127, whereby the eight directions of motion of the burner mentioned above can be modified into a further eight directions. In this manner it is possible to cut in practically all directions occurring with motor driving. The changing over to manual driving can be accomplished, just as before, in a simple and practically instantaneous manner.

What I claim is:

1. A blowpipe cutting or welding machine, comprising a burner, a plurality of linearly slidable supports and rotary supports carrying the said burner, and, in different combinations, simultaneously operable means for individually operating the several supports for moving the burner along any direction in a plane and in a direction perpendicular to that plane, and along circles, whereby the center of the circular movements of at least one of the rotary supports is shiftable along any direction in a plane and a direction perpendicular to that plane.

2. A blowpipe cutting or welding machine, comprising a burner, a plurality of linearly slidable supports and rotary supports carrying the said burner, and, in different combinations, simultaneously operable means for moving the burner along any direction in a plane and in a direction perpendicular to that plane in curves determined by a template, and along circles, whereby the center of the circular movements of at least one of the rotary supports is shiftable along any direction in a plane and a direction perpendicular to that plane.

3. A blowpipe cutting or welding machine, comprising a burner, a plurality of linearly slidable supports and rotary supports carrying the said burner, and, in different combinations, simultaneously operable means for individually operating the several supports for moving the burner along any direction in a plane and in a direction perpendicular to that plane, and along circles, whereby the center of the circular movements of at least one of the rotary supports is shiftable along any direction in a plane and in a direction perpendicular to that plane, the said means being adapted for moving the individual linear supports along directions enclosing an angle adjustable to any desired value and also along a direction substantially perpendicular to the movements enclosing the said adjustable angle.

4. A blowpipe cutting or welding machine, comprising a burner, a plurality of linearly slidable supports, at least two rotary supports, the said linear and rotary supports carrying the said burner and in different combinations, simultaneously operable means for operating each of the said supports individually, the means of operating the said rotary supports moving the burner in circles graduated in size from those having a large radius down to circles having a zero radius, the combined means moving the burner through three-dimensional space and through a plurality of the said circles, the centers of which can lie side by side in three-dimensional space.

5. A blowpipe cutting or welding machine, comprising a burner, a plurality of linearly slidable and rotary supports on which the said burner is carried, the said supports comprising a longitudinally slidable support, a post mounted thereon, a vertical support slidably mounted on the said post, an outrigger-arm mounted on the vertical support, a transversely slidable support on the said outrigger-arm, and, in different combinations, simultaneously operable means for operating each support individually for moving the burner along three-dimensional space and along circles, the centers of which can lie side by side in three-dimensional space, the direction of movement of the transversely slidable support being adjustable relative to the longitudinally slidable support by means of the post.

6. A blowpipe cutting or welding machine, comprising a longitudinally slidable support, a post mounted thereon, a vertical support slidably arranged on the said post, an outrigger-arm mounted on the said vertical support, a transversely slidable support carried by the said outrigger arm, a rotary support carried by the transversely slidable support and for which the latter acts as a bearing, an arm slidable in the said rotary support, a burner carried by the said arm, and in different combinations, simultaneously operable means for operating each of the said supports individually, for moving the burner through three-dimensional space and along circles, the centers of which can lie side by side in three-dimensional space, the direction of the movement of the transversely slidable support being adjustable relative to the longitudinally slidable support by means of the post.

7. A blowpipe cutting or welding machine comprising a longitudinally slidable support, a post forming a rotary support mounted on the said longitudinal support, a vertical support slidably arranged on the post, an outrigger-arm carried by the vertical support, a transversely slidable support movable along the outrigger-arm, a second rotary support for which the transversely slidable support acts as a bearing, an arm slidable in the said second rotary support, a burner carried by the said arm, mechanical means for individually operating, in different combinations, the said supports, and hand means for also individually operating the said supports in different combination, the relation of the said supports to each other being such that the burner may be moved through three-dimensional space and along circles, the centers of which can lie side by side in three-dimensional space, the direction of movement of the transversely slidable support being adjustable relative to the longitudinally slidable support by means of the post.

8. A device according to claim 7 in which all of the mechanical means for operating the supports are driven by a single motor.

9. A device according to claim 7 in which mechanical means for operating the supports are driven by a single motor mounted in the burner machine itself.

10. A blowpipe cutting or welding machine, comprising a burner, a longitudinally slidable support, a rotary support in the form of a post mounted on the said longitudinally slidable support, a vertical support slidably arranged in the said post, an outrigger-arm carried by the vertical support, a transversely slidable support movable along the outrigger-arm, the burner being carried by the transversely slidable support, mechanical means for individually driving, in different combinations, the said supports, a main drive for the said mechanical means, a clutch mechanism interposed between the said mechanical means and the main drive, whereby selected ones of the supports may be placed independently into engagement with the main drive, the relation of the said supports to each other being such that when they are operated individually, the burner may be moved through three-dimensional space and along circles, the centers of which can lie side by side in three-dimensional space.

11. A blowpipe cutting or welding machine, comprising a burner, an arrangement of linearly slidable and rotary supports for carrying the said burner, the said supports comprising a longitudinally slidable support, a rotary support comprising a post carried by the longitudinally slidable support, a vertical support slidably mounted on the said post, an outrigger-arm carried by the vertical support, a transversely slidable support movable along the said outrigger arm, the burner being carried by the transversely slidable support, the direction of movement of the transversely slidable support relative to the longitudinally slidable support being adjustable by means of the said post, mechanical means for individually actuating in different combinations, the said supports, a main drive for actuating the mechanical means, a clutch comprising a reversing gear arranged between the mechanical means and the main drive, and a common control for the reversing gear controlling at least the longitudinally slidable and the transversely slidable supports, the relation of the supports to each other being such that the burner may be moved through three-dimensional space and along circles, the centers of which can lie side by side in three-dimensional space.

12. A blowpipe cutting or welding machine, comprising a burner, a plurality of linearly slidably and a plurality of rotary supports on which the burner is carried, the said plurality of supports comprising a longitudinally slidable support, a rotary support in the form of a post mounted on the said longitudinally slidable support, a vertical support slidably arranged on the post, an outrigger-arm on the vertical support, a transversely slidable support movable along the outrigger-arm, the burner being carried by the transversely slidable support, the direction of movement of the transversely slidable support being adjustable relative to the longitudinally slidable support by means of the post, means for operating the said supports individually and in different combinations, and a common handle for controlling at least some of the said supports, the relation of the supports to each other being such that the burner may be moved through three-dimensional space and along circles, the centers of which can lie side by side in three-dimensional space.

13. A blowpipe cutting or welding machine, comprising a longitudinal support, a round support in the form of a post mounted on the longitudinal support, a vertical support slidably arranged on the post, an outrigger-arm carried on the vertical support, a transverse support movable along the outrigger-arm, the direction of movement of the transverse support being adjustable relative to the longitudinal support by means of the post, a second round support for which the transverse support acts as a bearing, an arm slidable in the round support, a burner carried by the said arm means for driving the several supports individually, gearing having a changeable ratio of transmission and a plurality of couplings for effecting the operation of the said longitudinal, transverse, and second round supports in such manner that either or both of the longitudinal or transverse supports may be driven, and a second coupling insertable in the drive for the transverse support whereby either the transverse or the said second round support is driven.

14. A blowpipe cutting or welding machine, comprising a longitudinal support, a post mounted on the said support, a vertical support slidable along the said post, an outrigger-arm carried by the said vertical support, a transverse support movable along the said outrigger-arm, a round support for which the transverse support acts as a bearing, an arm slidable in the round support, a burner carried by the said arm, means for actuating the said elements, a leading screw connected with the actuating means for operating the transverse support, a shaft connected with the said means and lying substantially parallel to the leading screw, for the operation of the round support, and a coupling for interchangeably connecting the leading screw and the shaft with the said means.

15. A blowpipe cutting or welding machine, comprising a longitudinal support, a post mounted thereon, a vertical support slidable along the said post, an outrigger-arm carried by the vertical support, a transverse support movable along the outrigger-arm, a round support for which the transverse support acts as a bearing, an arm slidable in the said round support, a burner carried by the said arm, a motor for driving the aforementioned parts, manual means for operating the said longitudinal support, and manual means common to the transverse and round supports for operating the same, whereby when the motor drive is cut off the longitudinal support and the combined transverse and round supports may be manually actuated selectively or simultaneously for executing complicated cuts or corrections.

16. As a part of a blowpipe cutting or welding machine, an outrigger-arm, a transverse support movable along the said outrigger-arm, a driving wheel for actuating the said transverse support, a round support for which the transverse support acts as a bearing, an arm slidable in the round support, a burner carried by the said arm, a hollow formed axle in the round support, a spindle carried by the said hollow axle, a disengageable gear and a hand wheel on the said spindle, the said spindle effecting a radial displacement of the said arm through the teeth of the said gear upon turning of the hand wheel.

17. A blowpipe cutting or welding machine according to claim 16, in which the said driving wheel is formed as a fly wheel, the said machine including an axially shiftable handle on the fly wheel for manual operation thereof, the said handle being adapted for actuating the said coupling members.

18. A blowpipe cutting or welding machine according to claim 16 in which the driving wheel is formed as a fly wheel, the said machine including ratchet wheels for both the leading screw and the shaft, an axially shiftable handle for the fly wheel, a collar cooperable with the said handle, and spring-actuated clutches mounted on the driving wheel and adapted upon actuation of the said handle to alternately engage with selected ones of the said ratchet wheels.

19. A blowpipe cutting or welding machine, comprising a longitudinal support, a post mounted on the said support, a vertical support slidable along the said post, an outrigger-arm carried by the said vertical support, a transverse support movable along the vertical support, a round support for which the said transverse support acts as a bearing, an arm slidable in the round support, a burner carried by the said arm, a common means for driving at least the longitudinal, transverse and round supports, the said means comprising reversing gearing with changeable ratio of transmission and a plurality of couplings, a coupling in the drive of the transverse support whereby the said transverse support and the round support may be driven, a governing rod for the said reversed gearing, a supporting arm in which the said governing rod is slidably and rotatably supported, and a handle for shifting the governing rod in the said supporting arm for pivotally moving the governing arm in selected ones of eight directions whereby the longitudinal and transverse supports may be selectively or simultaneously moved either forwardly or rearwardly to guide the burner in a direction corresponding to the motion of the handle.

20. A blowpipe cutting or welding machine according to claim 19 in which the said handle comprises a forked piece having guide faces parallel and rigidly secured to the governing rod, and an eccentric disc provided with a handle, the said disc being rotatable between the parallel guide faces of the forked piece.

21. A blowpipe cutting or welding machine according to claim 19 in which the said handle comprises a forked piece rigidly secured to the governing rod, and having parallel guide faces, an eccentric disc provided with a handle and rotatable between the said parallel guide faces, the said forked piece having stops and spring blades having wedges secured thereto, which wedges can engage the said stops to retain the handle in a selected position.

22. In a blowpipe cutting or welding machine, an outrigger-arm, a transverse support movable along the outrigger-arm, a round support for which the transverse support acts as a bearing, an arm slidable in the round support, a guide socket pivotally mounted on the said arm, and having an opening therein, a burner carried by the said guiding socket, the said burner having a groove thereabout, and means on the arm passing through the said opening and engaging with the groove to retain the burner in its operable position.

23. In a blowpipe cutting or welding machine, a round support, means for rotating the said round support, two arms slidable in the round support, and arranged symmetrically to the axis of rotation thereof, a burner in each of the said arms, and means for moving the arms in directions opposite to each other.

24. In a blowpipe cutting or welding machine, a round support, means for rotating the said round support, two arms slidable in the round support, and arranged symmetrically to the axis of rotation thereof, rollers supporting the said arms in the round support, a burner in each of the said arms, and means for moving the arms in directions opposite to each other.

25. In a blowpipe cutting or welding machine, an outrigger-arm, a transverse support movable along the said outrigger-arm, a round support for which the transverse support acts as a bearing, an intermediate piece inserted in the said rotary support provided with a pivotable and flexible guide, an arm slidable along the said guide, and a burner carried by the said arm, inclination of the burner by means of the guide to an inclined position permitting the cutting of the bevelled edges.

26. A blowpipe cutting or welding machine, comprising a burner, a plurality of linear and round supports on which the said burner is carried, means for operating the said supports individually, whereby the burner may be moved in three-dimensional space, the said supports comprising at least a longitudinal support, a vertical support, a transverse support, and a packing strip along the front sides of the longitudinal support for preventing the entrance of foreign material.

27. In a blowpipe cutting or welding machine, a post, a vertical support slidable along the said post, an outrigger-arm carried by the said vertical support, a transverse support movable along the said outrigger-arm, a round support for which the transverse support acts as a bearing, an arm slidable in the said round support, a burner carried by the said arm, gearing for each of the transverse and round supports for operating the same, a planet gear adapted for alternatively engaging the said supports with the gearing for alternatively influencing the speed of the transverse member and the speed of rotation of the round support, and locking means for locking the planet gear for complete disengagement.

28. In a blowpipe cutting or welding machine, a post, a vertical support slidable along the said post, an outrigger-arm carried by the vertical support, a transverse support movable along the outrigger-arm, a round support for which the transverse support acts as a bearing, an arm slidable in the round support, a burner carried by the said arm, a leading screw in the outrigger-arm for actuating the transverse support, a shaft lying substantially parallel to the leading screw and also in the outrigger-arm for operating the round support, a driving wheel common to the said leading screw and the said shaft, concentric tubes mounted on the said shaft and freely rotatable thereon, two freely rotatable pairs of wheels on the said concentric tubes, planet wheels supported in the said driving wheel and engaging with the said pairs of gears, and a pinion common to the said pairs of gears and disengageable therewith.

29. In a blowpipe cutting or welding machine, a post, a vertical support slidable along the said post, an outrigger-arm carried by the vertical support, a transverse support movable along the outrigger-arm, a round support for which the transverse support acts as a bearing, an arm slidable in the round support, a burner carried by the said arm, a leading screw in the outrigger-arm for actuating the transverse support, a shaft lying substantially parallel to the leading screw and also in the outrigger-arm for operating the round support, a driving wheel common to the said leading screw and the said shaft, concentric tubes mounted on the said shaft and freely rotatable thereon, two freely rotatable pairs of wheels on the said concentric tubes, planet wheels supported in the said driving wheel and engaging with the said pairs of gears, a pinion common to the said pairs of gears and disengageable therewith, a fork in which the said pinion is mounted, the said fork being both axially slidable and pivotal through a limited angular range, and ratchet teeth on the said fork for blocking selected ones or both of the said pairs of gears, when the ratchet teeth are raised and are pivoted and subsequently lowered into their operable position.

30. In a blowpipe cutting or welding machine, a post, a vertical support slidable along the said post, an outrigger-arm carried by the vertical support, a transverse support movable along the outrigger-arm, a round support for which the transverse support acts as a bearing, an arm slidable in the round support, a burner carried by the said arm, a leading screw in the outrigger-arm for actuating the transverse support, a shaft lying substantially parallel to the leading screw and also in the outrigger-arm for operating the round support, a driving wheel common to the said leading screw and the said shaft, concentric tubes mounted on the said shaft and freely rotatable thereon, two freely rotatable pairs of wheels on the said concentric tubes, planet wheels supported in the said driving wheel and engaging with the said pairs of gears, the said planet wheels having a hub, a pinion slidably mounted on the said hub and secured against rotation, a driving wheel for each of the leading screw and shaft, a common driving means for actuating the said driving wheels, and means for sliding the pinion for alternative engagement with the said driving wheels, thereby connecting the selected driving wheel to the driving means.

In witness whereof I have hereunto signed my name.

ADAM SCHMIDT.